Feb. 28, 1967   R. C. WOODS ETAL   3,305,908
CONCRETE PIPE SEAL GROOVE FORMING MECHANISM
Filed June 17, 1964   3 Sheets-Sheet 1

INVENTORS
RANDELL C. WOODS
THOMAS J. ENGLE
DANIEL J. CONLEY
RONALD P. KIRCHNER
HOWARD T. REX
BY Farley, Forster and Farley
ATTORNEYS INVENTORS
RANDELL C. WOODS
THOMAS J. ENGLE
DANIEL J. CONLEY
RONALD P. KIRCHNER
HOWARD T. REX
BY Farley, Forsty and Farley
ATTORNEYS

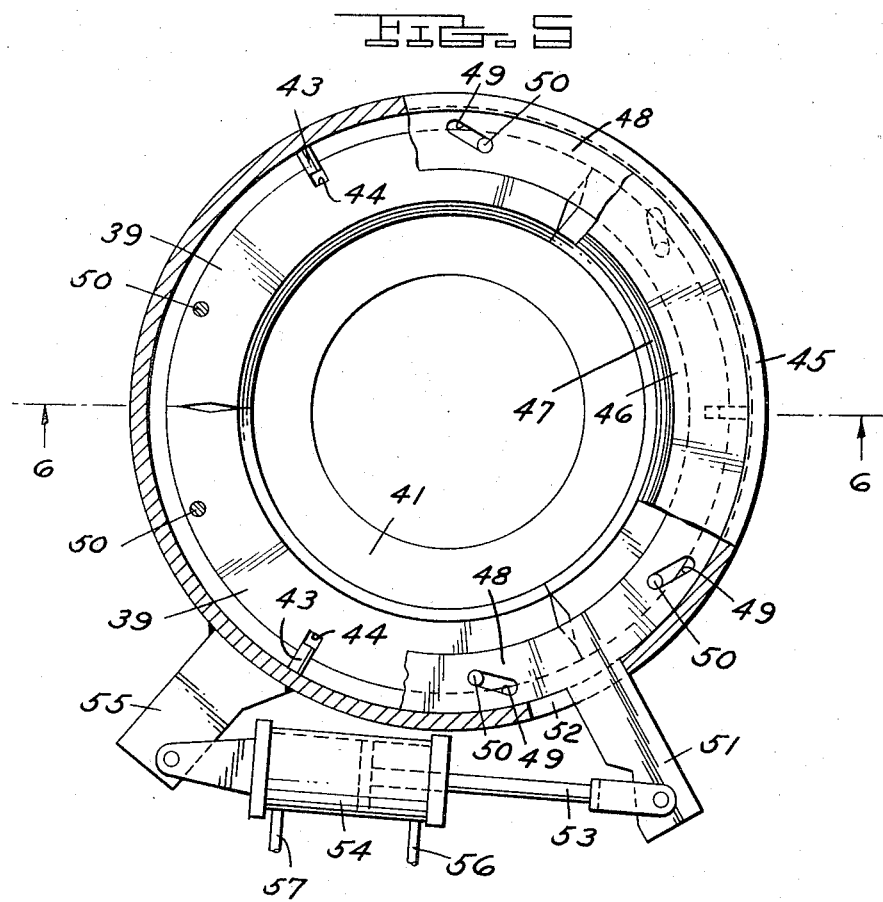
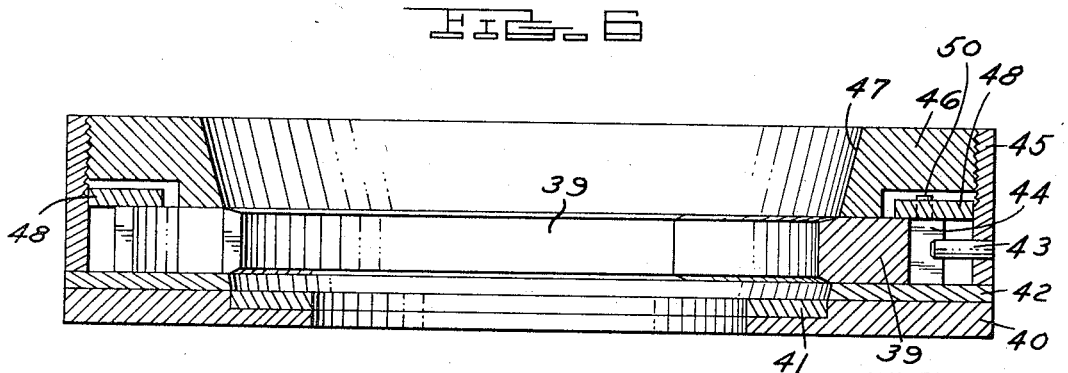

United States Patent Office 3,305,908
Patented Feb. 28, 1967

3,305,908
CONCRETE PIPE SEAL GROOVE FORMING MECHANISM
Randell C. Woods, Dearborn, Thomas J. Engle, Rockwood, Daniel J. Conley, Detroit, Ronald P. Kirchner, Dearborn, and Howard T. Rex, Franklin, Mich., assignors to Superior Products Company, Detroit, Mich., a corporation of Michigan
Filed June 17, 1964, Ser. No. 375,819
4 Claims. (Cl. 25—39)

This invention relates to a device for forming seal grooves in the ends of concrete pipe which, as in the case of sewer pipe, may be required to accommodate gasket seals for engaging the bell-mouth end of adjacent pipe.

It has been customary practice in the forming of such grooves to employ clamped rings which are left assembled to the end of the pipe after forming and withdrawal of the pipe from the pipe mold until the pipe has set sufficiently to permit withdrawal of the rings without damage to the grooves. The placement and removal of such rings has been a time consuming process in the manufacture of concrete pipe and has required an expensive complement of groove rings for each pipe size which for typical production rates may cost in the order of $10,000 per set. The present groove forming mechanism adapted for use at the top or bottom end of a conventional concrete pipe forming mold has been developed to form satisfactory seal grooves at the same time that the main body of the pipe is formed and to completely eliminate the former requirement for a complement of rings to be left on the pipe upon withdrawal from the mold. The cost of the mechanism has been found to be approximately one-tenth the cost of a complement of rings and also to save the labor of two men per shift during normal production runs.

These and other objects of the invention will best be understood from the following detailed description of a preferred embodiment with reference to the drawings wherein:

FIG. 5 is a plan view partially sectioned of a modified groove forming mechanism; and FIG. 6 is a sectional view taken along the line 6—6 of FIG. 5.

Figure 1:
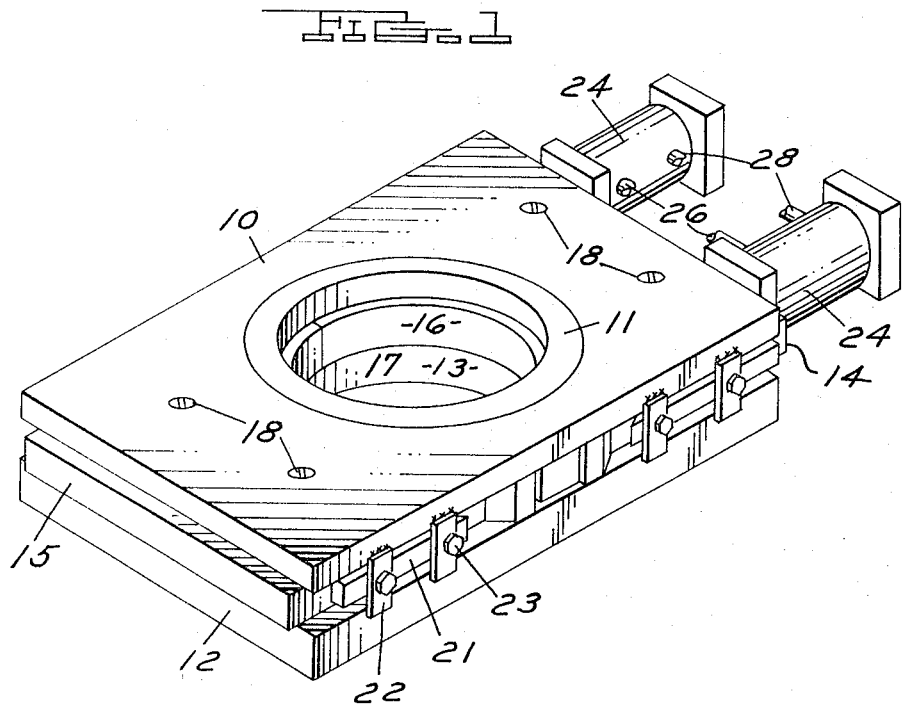
FIG. 1 is a perspective view of the groove forming mechanism.

The main elements of the mechanism include an upper solid plate 10 having an insert wear-resistant ring 11, a lower solid plate 12 having an insert wear-resistant ring 13, a pair of intermediate slidable plates 14 and 15 having groove forming split-ring insert elements 16 and 17 mounted therein. Four tie bolts 18 connect the upper and lower plates, passing through elongated slots 19 in the intermediate plates 14 and 15. The intermediate plates are recessed at their sides 20 to engage adjustable guide shoes 21 positioned from straps 22, welded to the upper and lower plates, by adjustment screws 23. A pair of hydraulic cylinders 24 mounted on the end of the intermediate plate 14 each has a piston rod 25 extending through the intermediate plate 14 anchored to the intermediate plate 15. The lower plate 12 registers against the top end of a conventional pipe mold 32 which may be indexed by means not shown to a pipe-forming position under the groove forming mechanism which is in turn movable vertically by means not shown after the forming operation.

Figure 4:
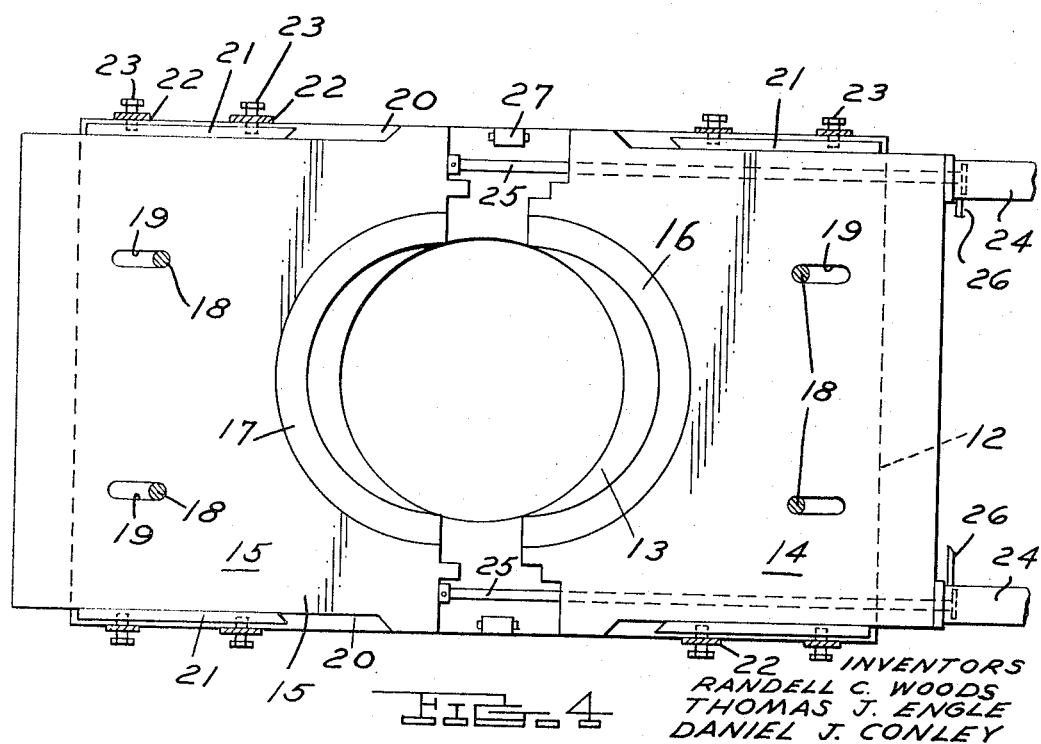
FIG. 4 is a similar view showing the mechanism in open position.

Hydraulic pressure applied to lines 26 tensions the piston rods urging the intermediate plates 14 and 15 toward each other and against adjustable positive stops 27 anchored to the respective upper and lower plates 10 and 12 and positioning the respective ends of the semicircular groove forming rings 16 and 17 in abutting relation. Hydraulic pressure in lines 28 places the piston rods 25 under compression forcing the intermediate plates 14 and 15 apart to the position shown in FIG. 4 as limited by engagement of the tie bolts 18 with the inner ends of the elongated slots 19.

Figure 2:
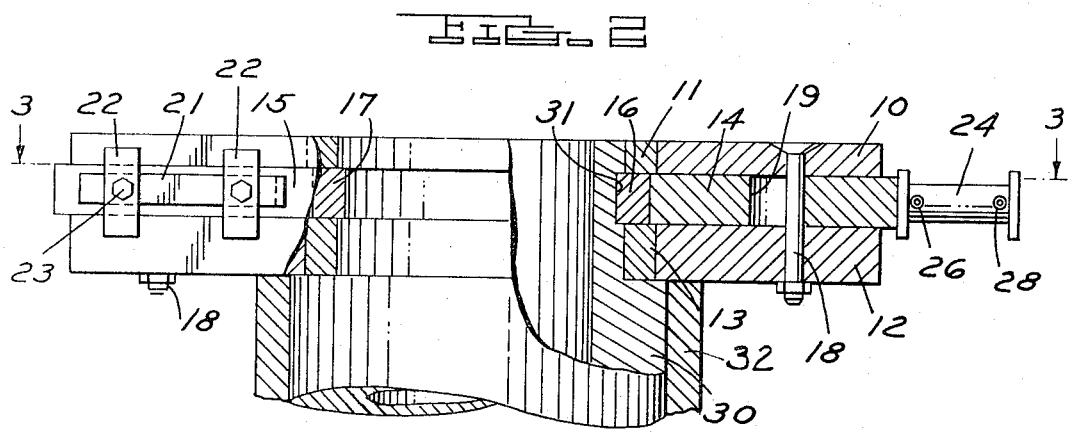
FIG. 2 is a partially sectioned side elevation thereof taken along the line 2—2 of FIG. 3.
Figure 3:
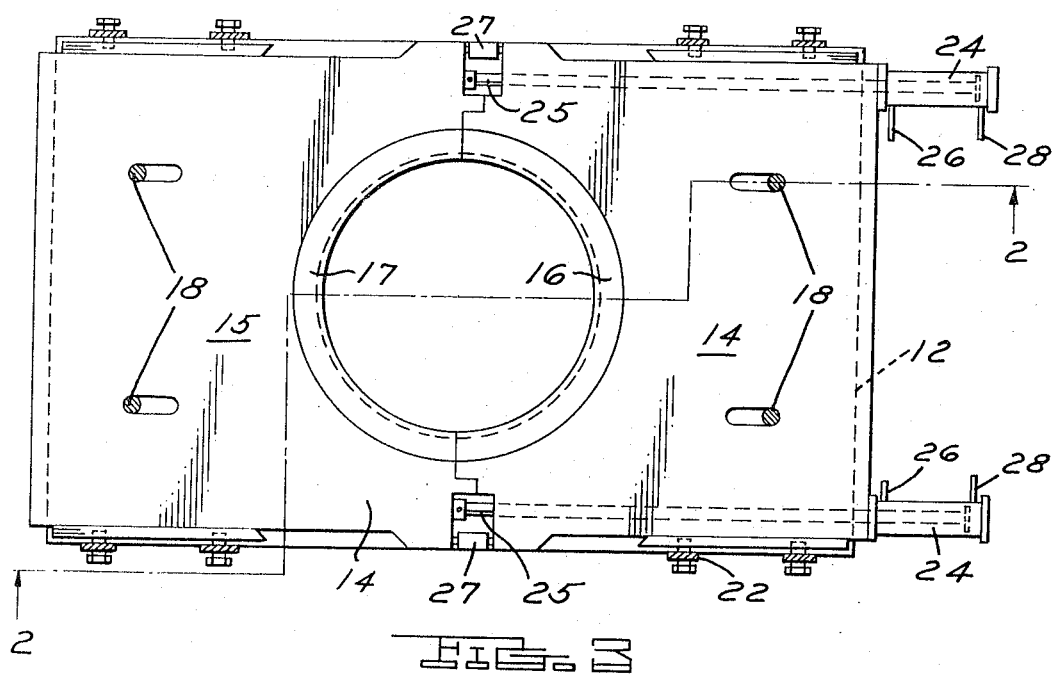
FIG. 3 is a sectional plan view taken along the line 3—3 of FIG. 2 showing the groove forming mechanism is closed position.

It will be understood that when this groove forming mechanism is positioned at the end of a pipe mold 32 with the intermediate plates 14 and 15 in the position shown in FIGS. 2 and 3 while the pipe 30 is formed by conventional means, a seal groove 31 will be formed therein by the groove forming ring elements 16 and 17 and that when the hydraulic cylinders 24 are actuated to retract the intermediate plates 14 and 15, the rings 11 and 13 associated with the upper and lower plates 10 and 12 will support the pipe end on either side of the groove 31 so that the groove forming elements 16 and 17 may be retracted immediately upon forming the pipe without waiting for any preliminary setting and without damage to the walls of the seal groove. Likewise, with the intermediate pipes in the open position shown in FIG. 4 axial separtion of the pipe end from the groove forming mechanism may take place without damage to the pipe end or seal groove. With the respective plates in close fitting relationship as shown, abrasive wear from the concrete pipe materials will be substantially limited to the wear-resistant rings which may be replaced from time to time as required.

Referring to FIGS. 5 and 6 showing a modified construction for the groove forming mechanism which, in this instance, is designed for operation at the bottom end of a pipe mold, a base 40 having a wear ring 41, mounts an annular plate 42 on which three 120° groove-forming segments 39 are slidable in a radial direction relative to three fixed guide pins 43 engaging slots 44 in the center of each segment, the pins 43 being seated in a tubular housing 45 into which is threaded an upper bearing plate 46 engaging the top surface of the groove-forming segments and having a beveled face 47 forming the end of the pipe adjacent the groove. An actuating ring 48 is provided with a pair of elongated cam slots 49 for engaging a pair of actuating pins 50 seated in each of the groove-forming segments 39 projecting upwardly therefrom through the cam slots 49. The actuating ring 48 is adapted to bear at its outer circumference against the tubular housing 45 and is slidable through actuation of an arm 51 integrally formed thereon which projects through a slotted aperture 52 in the tubular housing 45 by means of a piston rod 53 extending from an actuating cylinder 54 anchored to an arm 55 welded to the housing. It will be understood from the above description that shifting of the ring 48 from the position shown in FIG. 5 in a clockwise direction through application of fluid pressure to line 56 will cause the cam slots 49 to move the pins 50 and groove-forming segments 39 in a radially outward direction to permit removal of the pipe end after forming and that return of the ring to the position shown in FIG. 5 by application of pressure to the line 57 will restore the ring-forming segments 39 to their operative position.

While a specific prefered embodiment of the present invention and modification thereof have been shown and described above in detail it will be understood that numerous other modifications might be resorted to with-

We claim:

1. A pipe seal groove forming mechanism comprising a pair of support ring plates, a plurality of split-ring groove-forming elements interposed between said support ring plates, and means for slidably actuating said split-ring elements relative to said support ring plates between a groove-forming position and a retracted position, said means including an annular ring adjacent said elements rotatably shiftable relative thereto, and cam means adapted to produce radial movement of said elements responsive to the shifting of said actuating ring, said cam means including inter-engaging pins and slots having relative radial camming components.

2. A pipe seal groove forming mechanism comprising a pair of support ring plates, a plurality of split-ring groove-forming elements interposed between said support ring plates, and means for slidably actuating said split-ring elements relative to said support ring plates between a groove-forming position and a retracted position, said means including an annular ring adjacent said elements rotatably shiftable relative thereto, and cam means adapted to produce radial movement of said elements responsive to the shifting of said actuating ring, said cam means including inter-engaging pins and slots having relative radial camming components, and guide means adapted to confine said elements against circumferential displacement.

3. A pipe seal groove forming mechanism comprising a pair of support ring plates, a plurality of split-ring groove-forming elements interposed between said support ring plates, and means for slidably actuating said split-ring elements relative to said support ring plates between a groove-forming position and a retracted position, said means including an annular ring adjacent said elements rotatably shiftable relative thereto, and cam means adapted to produce radial movement of said elements responsive to the shifting of said actuating ring, said cam means including inter-engaging pins and slots having relative radial camming components, and guide means adapted to confine said elements against circumferential displacement, said guide means including radial slots in the outer periphery of said elements and fixed guide means engaging said slots.

4. A pipe seal groove forming mechanism comprising a pair of support ring plates, a plurality of split-ring groove-forming elements interposed between said support ring plates, and means for slidably actuating said split-ring elements relative to said support ring plates between a groove-forming position and a retracted position, said means including an annular ring adjacent said elements rotatably shiftable relative thereto, and cam means adapted to produce radial movement of said elements responsive to the shifting of said actuating ring, said cam means including inter-engaging pins and slots having relative radial camming components, and guide means adapted to confine said elements against circumferential displacement, said guide means including radial slots in the outer periphery of said elements, fixed guide means engaging said slots and fluid pressure cylinder means adapted to actuate said ring.

References Cited by the Examiner

UNITED STATES PATENTS

| | | | |
|---|---|---|---|
| 165,710 | 7/1875 | Camp | 25—39 |
| 3,161,936 | 12/1964 | Tiller | 25—39 |
| 3,201,844 | 8/1965 | Poitras | 25—39 |

J. SPENCER OVERHOLSER, *Primary Examiner.*

R. D. BALDWIN, G. A. KAP, *Assistant Examiners.*